US011038818B2

United States Patent
Baphna et al.

(10) Patent No.: US 11,038,818 B2
(45) Date of Patent: *Jun. 15, 2021

(54) CONFIGURATION MANAGEMENT OF DISTRIBUTED VIRTUAL SWITCH

(71) Applicant: VMware, Inc., Palo Alto, CA (US)

(72) Inventors: Mukesh Baphna, Milpitas, CA (US); Piyush Kothari, Palo Alto, CA (US); Chi-Hsiang Su, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/697,586

(22) Filed: Apr. 27, 2015

(65) Prior Publication Data

US 2016/0191427 A1 Jun. 30, 2016

Related U.S. Application Data

(63) Continuation of application No. 13/472,810, filed on May 16, 2012, now Pat. No. 9,019,977.

(51) Int. Cl.
*H04L 12/931* (2013.01)
*H04L 12/24* (2006.01)

(52) U.S. Cl.
CPC .......... *H04L 49/70* (2013.01); *H04L 41/0803* (2013.01)

(58) Field of Classification Search
None
See application file for complete search history.

(56) References Cited

U.S. PATENT DOCUMENTS

| 6,085,238 A | * | 7/2000 | Yuasa | H04L 12/4641 370/409 |
| 2009/0292858 A1 | * | 11/2009 | Lambeth | H04L 29/12839 711/6 |
| 2010/0085975 A1 | | 4/2010 | Wang et al. | |

* cited by examiner

*Primary Examiner* — Yemane Mesfin
*Assistant Examiner* — Jeff Banthrongsack

(57) ABSTRACT

A method, non-transitory storage medium, and apparatus are presented for configuration management of a distributed virtual switch including components distributed on different entities in a computing system is provided. In an exemplary embodiment, a snapshot of a configuration of the distributed virtual switch is received from a management plane configured to manage the distributed virtual switch. The snapshot may include settings for the configuration at a time of taking the snapshot. A persistent storage location independent from the management plane is designated for storing the received snapshot of the configuration. After the snapshot is taken, the configuration may be retrieved from the persistent storage location and the settings of the configuration may be applied to the distributed virtual switch, a new distributed virtual switch, or an existing distributed virtual switch.

20 Claims, 9 Drawing Sheets

CONFIGURATION MANAGEMENT OF DISTRIBUTED VIRTUAL SWITCH

CROSS-REFERENCE TO RELATED APPLICATION

This application is a Continuation of U.S. patent application Ser. No. 13/472,810, for "Configuration Management of Distributed Virtual Switch", filed May 16, 2012, the contents of which is incorporated herein by reference in their entirety.

BACKGROUND

A distributed virtual switch (DVS) is a software abstraction of an aggregate switch that may include multiple virtual switches within computer servers (e.g., hosts). The distributed virtual switch is managed in a centralized management plane through a management application, such as a data center management application. The management application exposes an interface to manage the configuration of the distributed virtual switch. Also, the management plane maintains the latest configuration of the distributed virtual switch in the management plane's memory or back-end database.

The latest configuration is embedded in the management plane. If the back-end database or memory is lost or corrupted and the management plane is restarted, there is no way to restore the configuration for the distributed virtual switch. Rather, the distributed virtual switch will have to be re-created from scratch. Additionally, only the latest version of the configuration is stored in the management plane. Thus, if misconfiguration with the distributed virtual switch or port group occur, an administrator cannot revert to any previous configuration or determine any changes across multiple configuration changes that were previously made.

SUMMARY

A method, non-transitory storage medium, and apparatus are presented for configuration management of a distributed virtual switch including components distributed on different entities in a computer system is provided. In an exemplary embodiment, a snapshot of a configuration of the distributed virtual switch is received from a management plane where the distributed virtual switch resides. The snapshot may include settings for the configuration at a time of taking the snapshot. A persistent storage location independent from the management plane is designated for storing the received snapshot of the configuration. After the snapshot is taken, the configuration may be retrieved from the persistent storage location and the settings of the configuration may be applied to the distributed virtual switch, a new distributed virtual switch, or an existing distributed virtual switch.

The following detailed description and accompanying drawings provide a more detailed understanding of the nature and advantages of particular embodiments.

DETAILED DESCRIPTION

In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
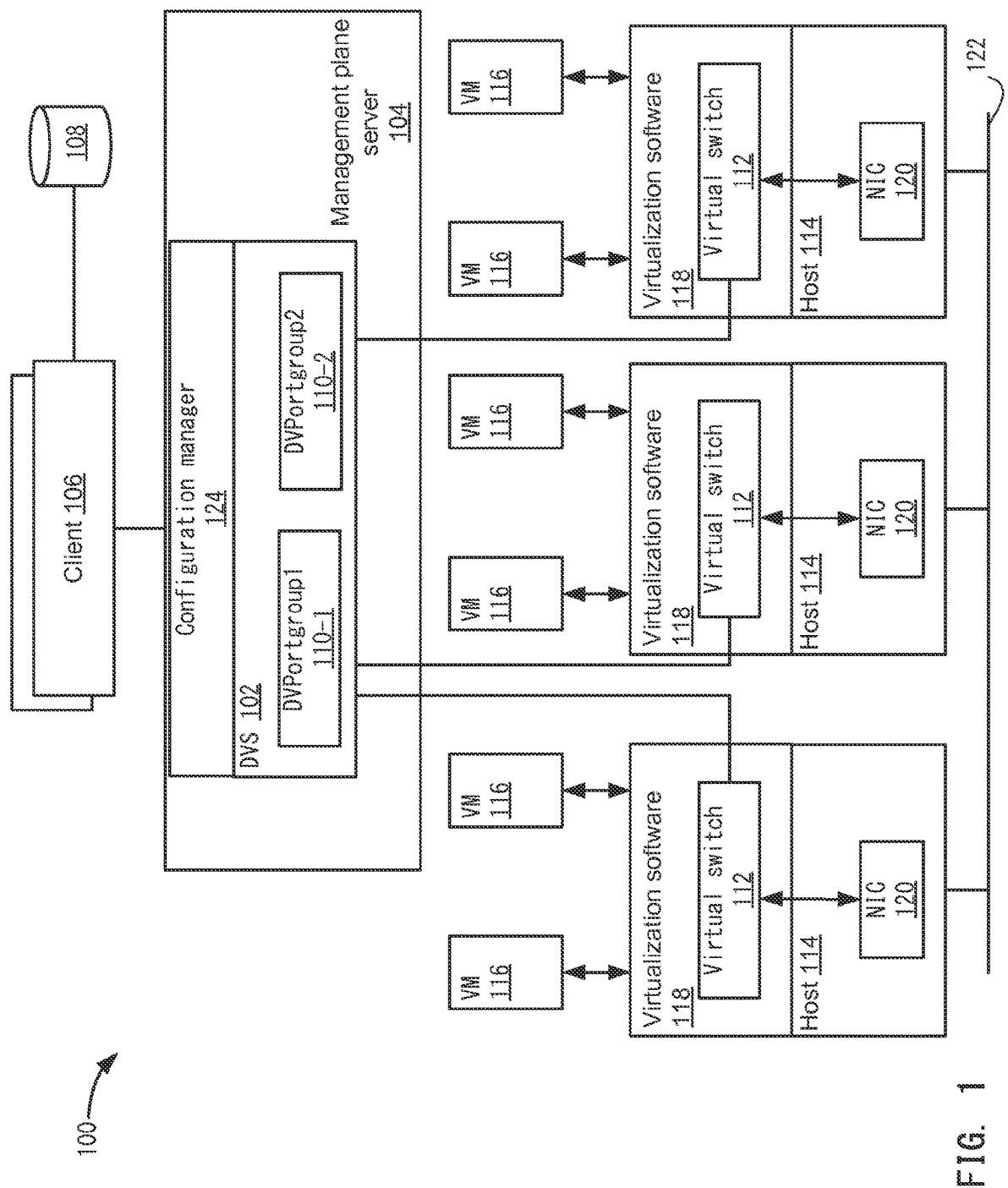
FIG. 1 depicts a system for managing a configuration of a distributed virtual switch (DVS) according to one embodiment.

FIG. 1 depicts a system 100 for managing a configuration of a distributed virtual switch (DVS) 102 according to one embodiment. A management plane server 104 operates in the management plane to configure and manage distributed virtual switch 102. Management plane server 104 exposes interfaces (e.g., command line interfaces (CLI) and user interfaces) that are used to change the configuration of distributed virtual switch 102 and that of distributed port-group through the management plane.

A client 106 includes a configuration manager 124 that communicates with management plane server 104 to have a snapshot of a configuration of distributed virtual switch 102 exported from the management plane. It will be understood that multiple clients 106 may be used. For example, a first client 106 may export the snapshot of the configuration and then a second client 106 may perform actions described below with respect to applying the configuration. Clients 106 may include a user interface, application programming interface (API), or a script. The snapshot may capture the current configuration settings for distributed virtual switch 102. Configuration manager 124 can then determine where to store the configuration. Because the configuration has been exported from the management plane, configuration manager 124 can store the configuration in different areas outside of the management plane represented broadly by storage 108 in FIG. 1. Additionally, multiple snapshots (versions) of the configuration of distributed virtual switch 102 may be exported and stored.

The configuration is exported from the management plane and stored as an independent entity from the current configuration of distributed virtual switch 102 that is stored in the management plane. By exporting the configuration as an independent entity from the management plane, different actions with the saved configuration may be performed, such as re-creating an original distributed virtual switch 102, creating a new distributed virtual switch 102 based on the stored configuration, and/or applying the stored configuration on an existing distributed virtual switch 102. Also, by exporting the configuration as an independent entity from the management plane, multiple versions of the configuration may be saved over time instead of just the latest version in the management plane. Thus, administrators are free to revert to prior configurations that are known to work, use the configurations to create new distributed virtual switches 102, or apply the configuration to existing distributed virtual switches 102.

Distributed virtual switch 102 may include a DVS configuration and also a port group configuration. The DVS configuration is the configuration at a distributed virtual switch level. For example, the DVS configuration includes network properties for connections used by virtual machines 116 to send and receive data via proxy switches 112 to and from a network 122 via a network interface card (NIC) 120. Port group properties may be the configuration for various port groups 110. A port group is a set of virtual ports that have the same configuration. As shown, distributed virtual switch 102 includes a first port group (DVPortgroup1) 110-1 and a second port group (DVPortgroup2) 110-2. When the term "configuration" is used, it may mean the DVS configuration and/or the port group configuration. The configuration is described in more detail below.

Distributed virtual switch 102 is a software abstraction that aggregates proxy switches 112. Virtual switches 112 are instantiated in virtualization software 118 running on hosts 114, connecting a set of virtual machines 116. Virtual switches 112 are proxy switches that are controlled via distributed virtual switch 102. Virtual switches 112 may reside on a variety of hardware in a distributed manner. However, the configuration of distributed virtual switch 102 is managed from a centralized position. For example, management plane server 104 is used to manage the configuration of distributed virtual switch 102.

Figure 2:
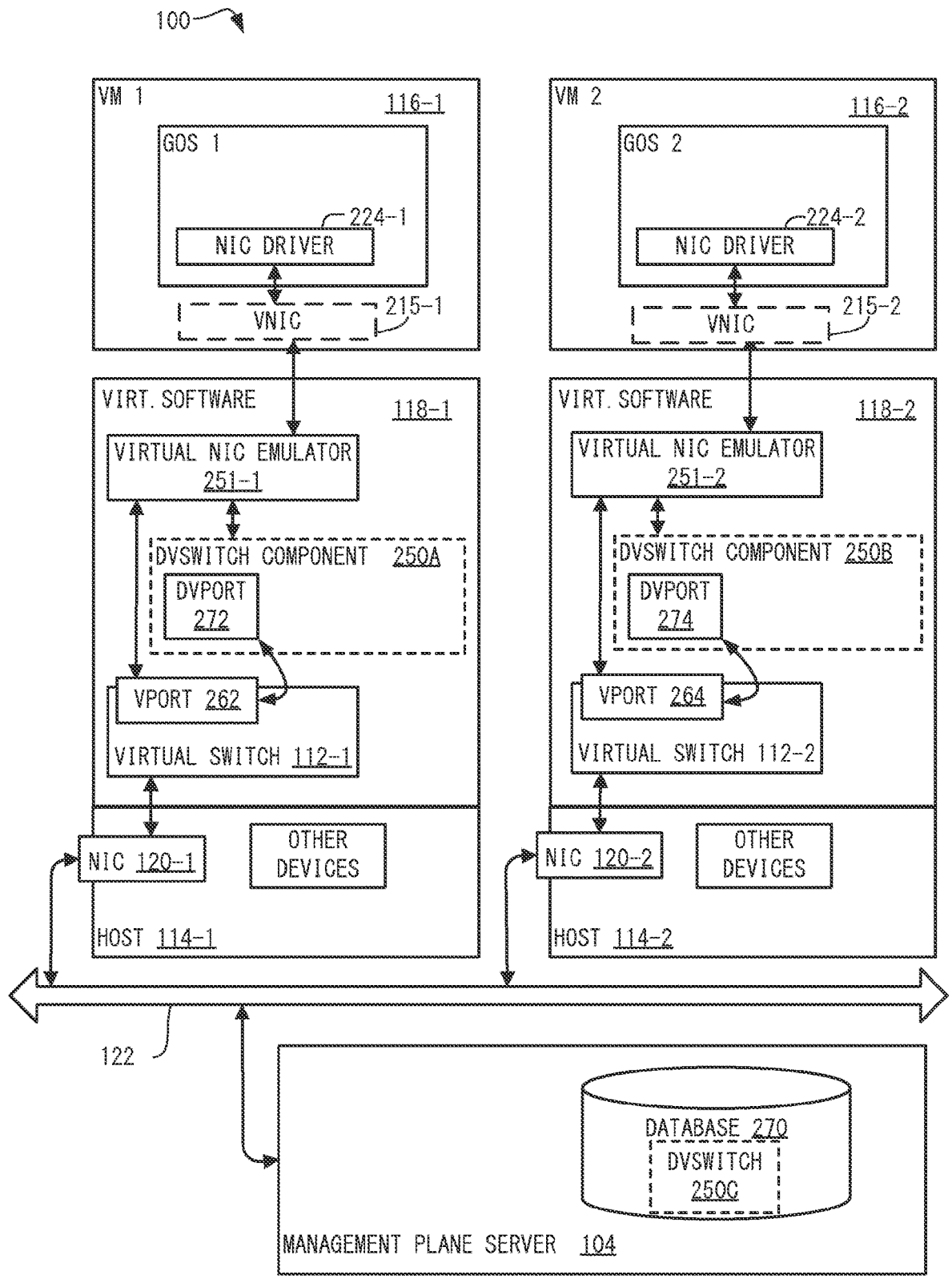
FIG. 2 depicts a more detailed example of the system according to one embodiment.

FIG. 2 depicts a more detailed example of system 100 according to one embodiment. Distributed virtual switch 102 comprises DVswitch components 250A, 250B, and 250C according to one embodiment. Distributed virtual switch 102 is a software abstraction that binds virtual switches 112-1, 112-2 in the managed collection into a single logical configurable entity in management plane server 104. FIG. 2 represents only two hosts 114-1, 114-2 each having only a single VM 116-1, 116-2 and corresponding virtual network interface cards (VNIC) emulators 251-1, 251-2, only for purpose of illustration. It should be recognized that distributed virtual switch 102 may span any number of hosts 114 each having any number of VMs 116, each, in turn, having any number of VNICs 251, any of which may be limited in number by available hardware resources of the individual hosts.

Distributed virtual switch 102, as a software abstraction, resides on the management plane. However, components for a distributed virtual switch reside on a variety of hardware, such as DVswitch components 250A, 250B, and 250C reside in hosts 114-1, 114-2 as well as database 270. DVswitch components 250A, 250B, and 250C are illustrated in FIG. 2 with a dotted line box indicating portions of DVswitch 250A, 250B, and 250C that make up a distributed virtual switch 102. The configuration of these components is managed centrally from management plane server 104. Virtual switches 112-1, 112-2 that are connected to the same physical network 122 are managed using one distributed virtual switch 102. Physical network 122, may be, e.g., a local area network.

As shown in FIG. 2, a single virtual port 262, 264 is maintained for each VNIC 215-1, 215-2, respectively. Each VNIC emulator 251-1, 251-2 interacts with NIC drivers 224-1, 224-2 in guest operating systems (GOS 1 and GOS 2) to send and receive data to and from VMs 116-1, 116-2. For example, each VNIC emulator 251-1, 251-2 may maintain the state for one or more VNICs 215-1, 215-2 for each VM 116-1, 116-2. Alternatively, multiple instances of VNIC emulators 251-1, 251-2 (only one shown for each host 114) may be instantiated within virtualization software 118-1, 118-2. For the purpose of illustration, FIG. 2 shows only one VNIC 251 for each VM 116, and only one VM 116 for each host 114. Those skilled in the art will recognize that discussion herein of VNICs 215-1, 215-2 is actually a discussion of a VNIC state implemented and maintained by each VNIC emulator 251-1, 251-2. Virtual devices such as VNICS 215-1, 215-2 are software abstractions that are convenient to discuss as though part of VMs 116-1, 116-2, but are actually implemented by virtualization software 118-1, 118-2 using emulators 251-1, 251-2. The state of each VM 116-1, 116-2, however, includes the state of its virtual devices, which is controlled and maintained by the underlying virtualization software 118-1, 118-2.

The port group configuration is the shared configuration of DVports 272, 274. A DVport is a software abstraction that encapsulates the "personality" (both configuration and runtime state) of a corresponding virtual port. Thus, DVport 272 contains one or more data structures representing the configuration and runtime state of virtual port 262 of a virtual switch 112-1. Likewise, DVport 274 contains one or more data structures representing the configuration and runtime state of virtual port 264 of virtual switch 602'. DVports are created with a configuration predefined by a network administrator. Virtual ports 262, 264 are created and start with a blank configuration state, but once associated with a DVport 272, 274, assume the configuration and runtime state of the associated DVport. The port configuration of DVports 272, 274 is stored in a table or other data structure within database 270 as the port group configuration.

The DVS configuration includes the connections needed to send/receive data to/from network 122. The term "connection" is used herein to describe an association of a virtual NIC with a DVport. In one embodiment, this association is maintained as the DVS configuration in management plane server 104. For example, the DVS configuration is stored in a table or other data structure within database 270. Also, the DVS configuration may be stored locally by virtualization software 118-1, 118-2.

Figure 3:
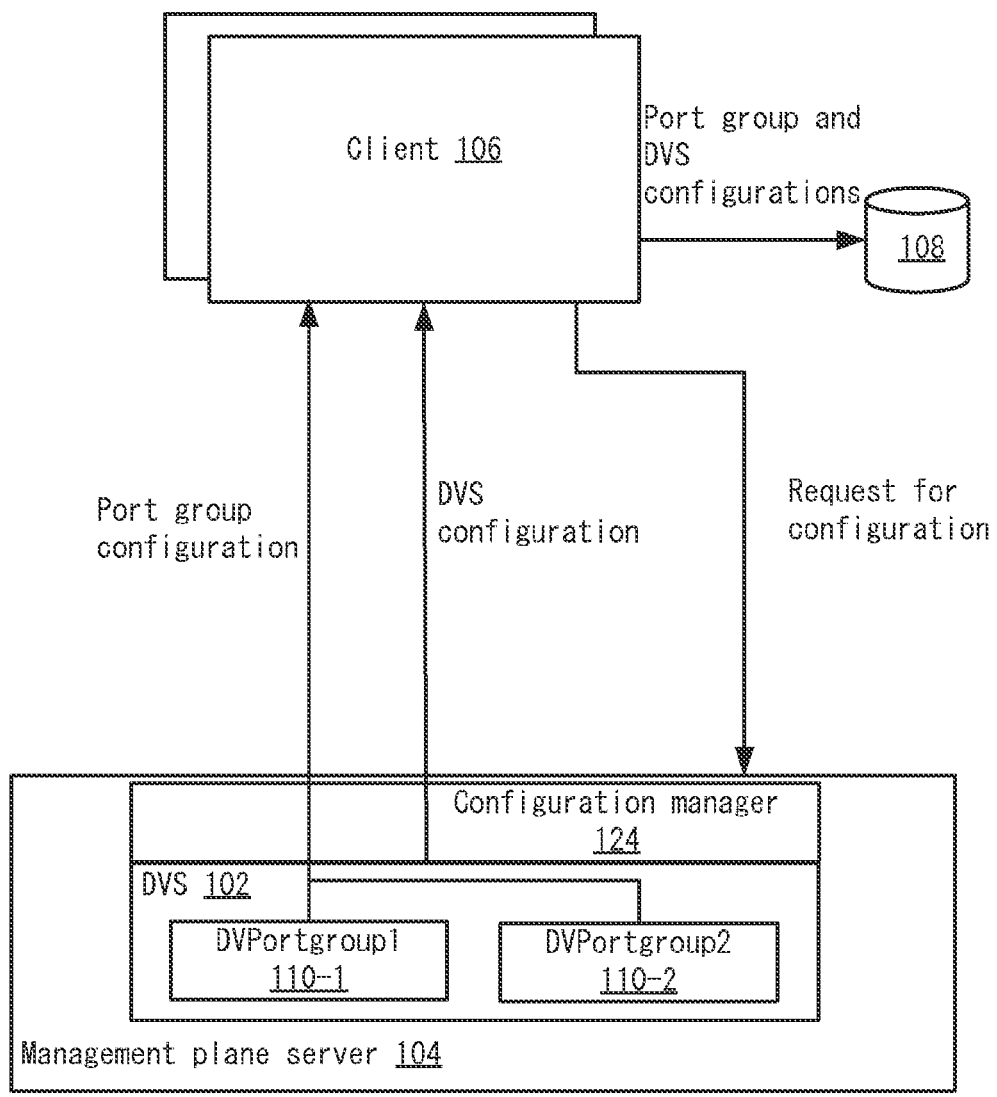
FIG. 3 depicts an example for exporting a configuration according to one embodiment.

The exporting and importing of the configuration will now be described in more detail. FIG. 3 depicts an example for exporting a configuration according to one embodiment. Client 106 may be located outside of the management plane. At certain times, client 106 may request the configuration of distributed virtual switch 102 may be exported to client 106.

As shown, management plane server 104 exports a DVS configuration and port group configuration. It should be recognized that only the DVS configuration or the port group configuration may be exported. Client 106 then can determine where to store the DVS configuration and port group configuration. For example, storage 108 may be memory or a persistent database independent from the management plane.

Figure 4:
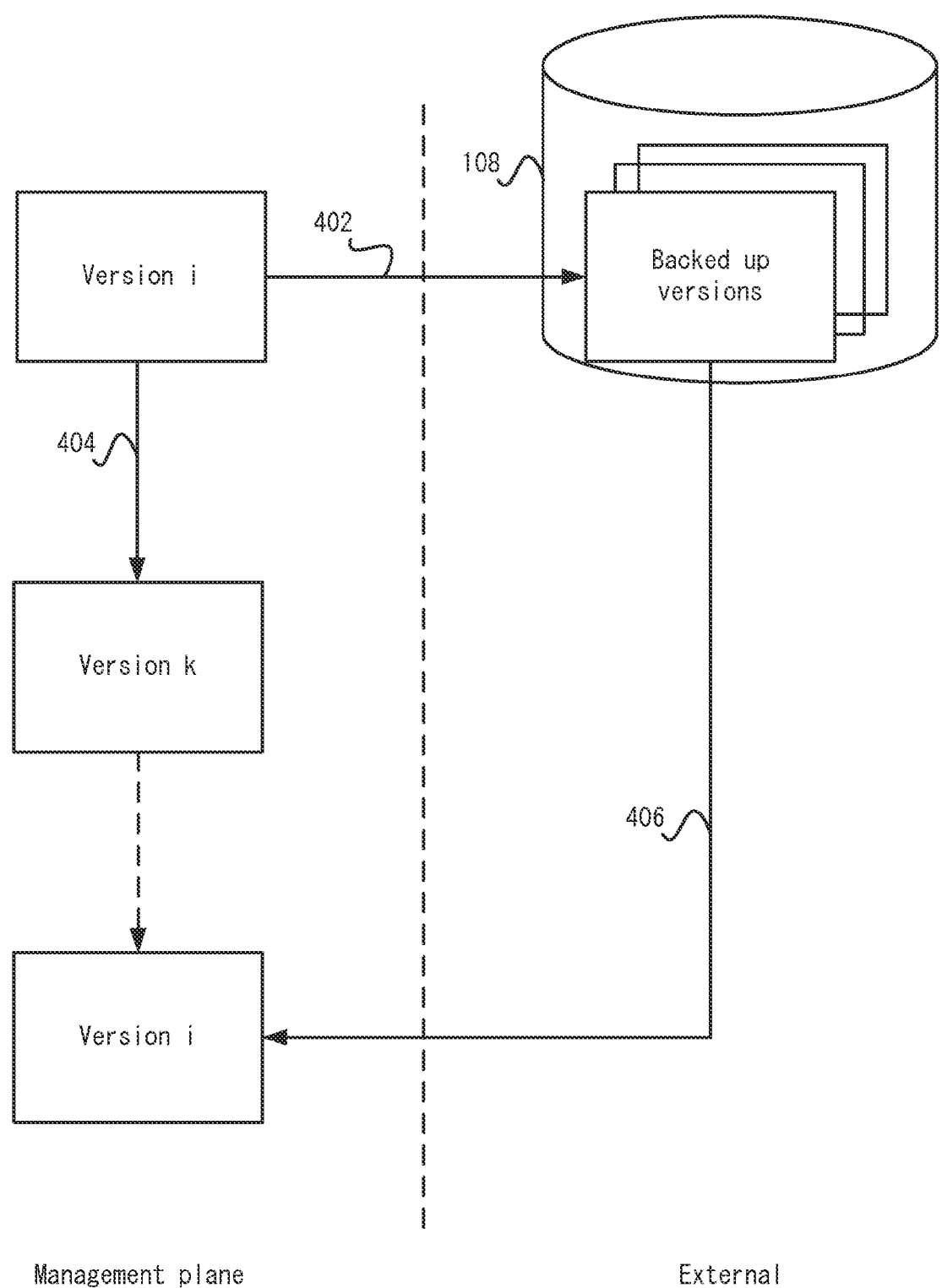
FIG. 4 depicts a flowchart for exporting and importing a configuration associated with a distributed virtual switch according to one embodiment.

Users are allowed to export the configuration as many as time as the user wants. A stored configuration may then be imported at a later time. For example, after exporting the configuration, client 106 may import a previous configuration to re-create the original distributed virtual switch 102, create a new distributed virtual switch 102, or apply the configuration to an existing distributed virtual switch 102. FIG. 4 depicts a flowchart for exporting and importing a configuration associated with distributed virtual switch 102 according to one embodiment.

At 402, management plane server 104 exports a configuration of a version i (Vi) for distributed virtual switch 102. Storage 108 may include multiple versions of the configuration that were exported at different times. A revision control system can be built on top of this as multiple versions of the configuration can be stored instead of only the latest configuration. The versions are exported from the management plane, such as in a datacenter, to storage 108, which is external from the management plane.

Figure 5:
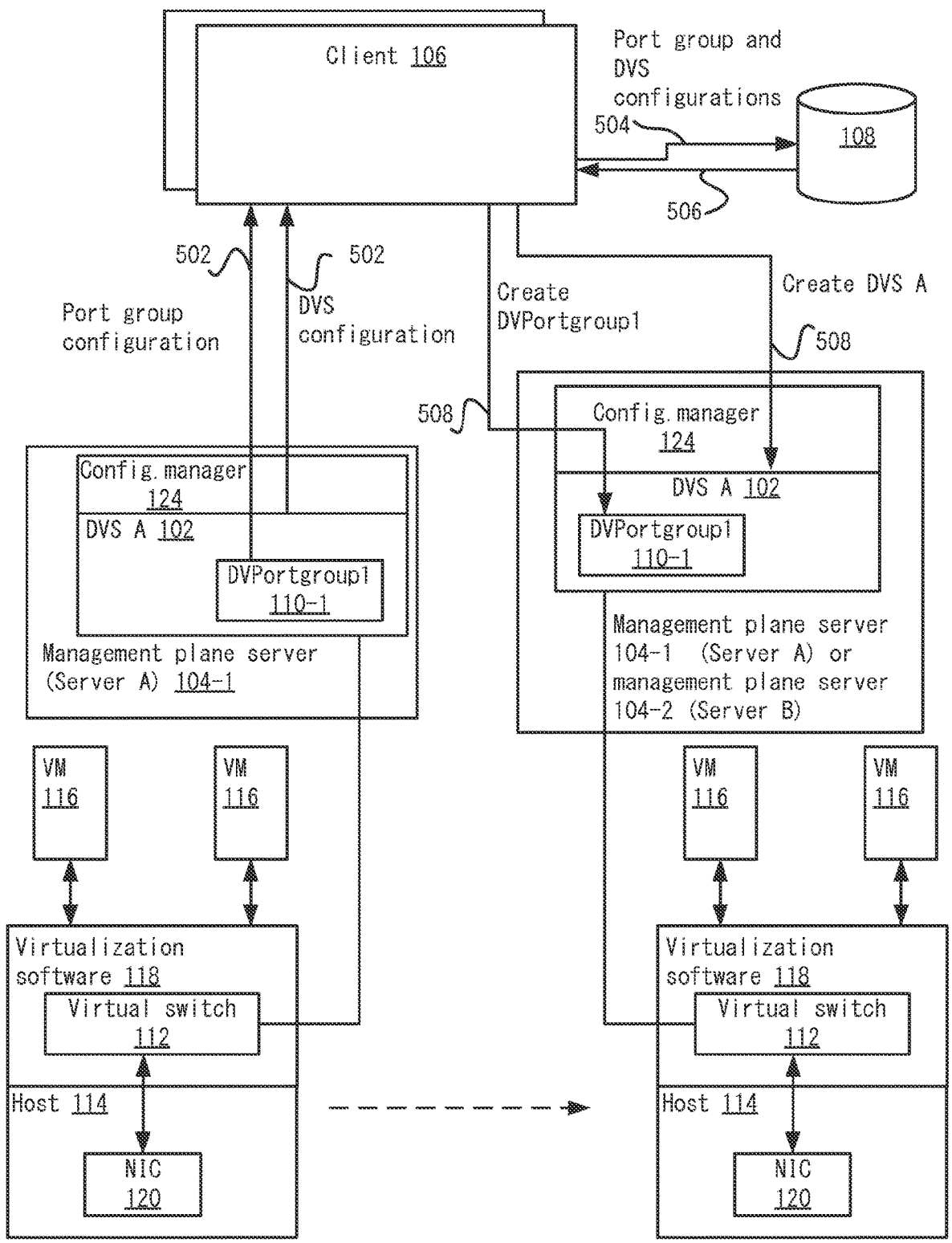
FIG. 5 depicts an example of using a configuration to re-create an original distributed virtual switch according to one embodiment.
Figure 6:
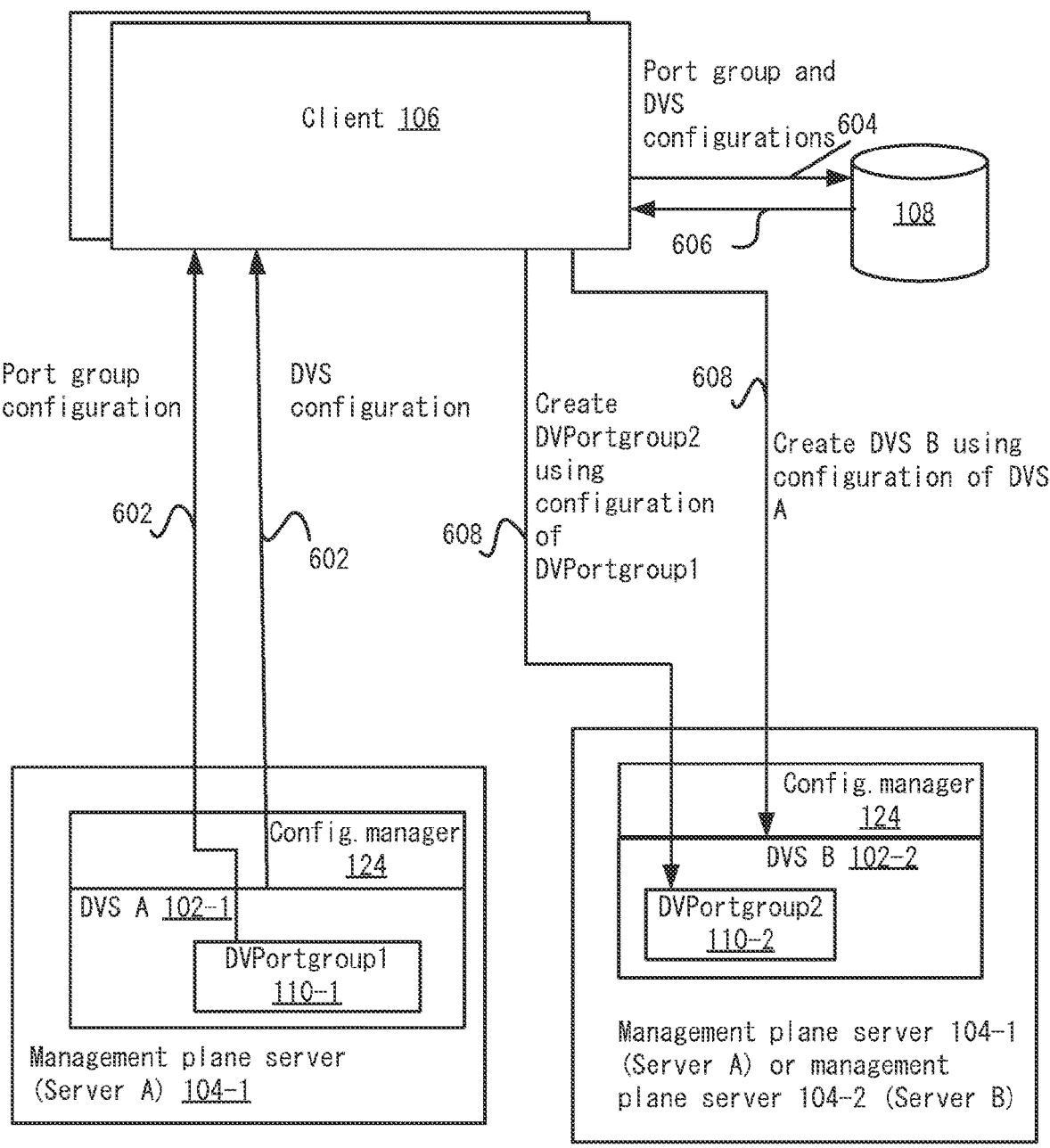
FIG. 6 depicts an example for using a stored configuration as a template for a new distributed virtual switch according to one embodiment.
Figure 7:
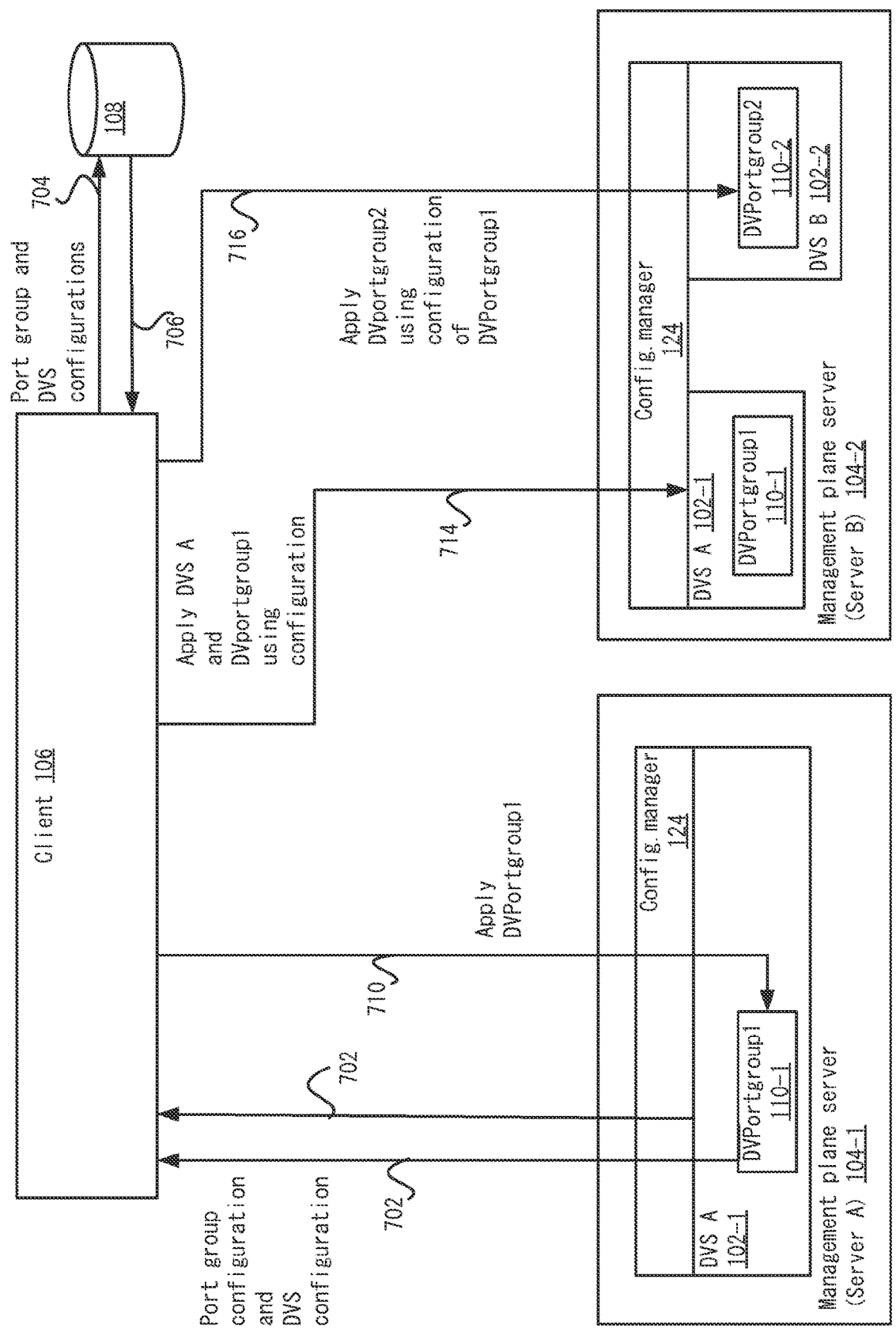
FIG. 7 depicts an example for applying a stored configuration to an existing distributed virtual switch according to one embodiment.

At 404, distributed virtual switch 102 may be re-configured many different times to go through different versions. At 406, client 106 may import a configuration (e.g., version Vi) from storage 108 to apply to a distributed virtual switch 102. The import operation can be executed in different modes. For example, an existing distributed virtual switch 102 may revert to the previous version, Vi, using the configuration for import in "apply-to-existing" mode. Additionally, a new distributed virtual switch 102 may be created using the previous version of the configuration for import in "create-new" mode, or the original distributed virtual switch 102 may be re-created for import in "create-original" mode. FIGS. 5-7 depict these different scenarios. Other scenarios of using the configuration may also be appreciated.

FIG. 5 depicts an example of using a configuration to re-create an original distributed virtual switch 102 according to one embodiment. At 502, a configuration including a DVS configuration and a port group configuration is exported to client 106, which stores the configuration in storage 108 at 504. At 506, when client 106 wants to re-create the original distributed virtual switch (DVS A) 102, the stored configuration from storage 108 is sent to configuration manager 124.

At 508, configuration manager 124 re-creates the original distributed virtual switch 102. The re-created distributed virtual switch 102 includes the same DVS configuration and port group configuration. The identifier (DVS A) of distributed virtual switch 102 and the port group identifier (DVPortgroup1) are the same. Also, in this case, the original distributed virtual switch 102 was coupled to host 114. Thus, the re-created original distributed virtual switch 102 is also coupled to the same host 114. This is because the configuration is the same in the re-created distributed virtual switch 102. The re-created distributed virtual switch 102 may be re-created in the same management plane server (server A) or a different management plane server (e.g., a server B). The VM and host 114 may automatically communicate through the re-created distributed virtual switch 102 without disruption.

One use case for users to re-create a distributed virtual switch 102 may be to migrate a distributed virtual switch from a test environment to a production environment. An administrator may test distributed virtual switch 102 in the testing setup. After testing, an administrator may want to move the distributed virtual switch 102 to a production setup. In this case, the administrator exports the tested configuration from the management plane to storage 108. Then, the tested configuration is imported to re-create distributed virtual switch 102 in the production setup with the original configuration from the test setup. The production setup re-creates the distributed virtual switch 102 that is used in the test setup so the connections in host 104 remain the same and virtual machines that use the distributed virtual switch 102 are not impacted.

FIG. 6 depicts an example for using a stored configuration as a template for a new distributed virtual switch. At 602, management plane server 104-1 exports the DVS configuration and port group configuration of distributed virtual switch (DVS A) 102-1 to client 106. At 604, configuration manager 124 stores the configuration in storage 108 and at 606, client 106 retrieves the configuration to create a new distributed virtual switch 102-2.

At 608, configuration manager 124 creates a new distributed virtual switch (DVS B) 102-2 using the configuration of distributed virtual switch 102-1. In such a case, the configuration of distributed virtual switch 102-1 is used as a template. The port group configuration of distributed virtual switch 102-1 is used to create a new port group configuration (DVPortgroup2) 110-2.

A clone of the original distributed virtual switch 102-1 may be created in the original management plane server (server A) 104-1 or another management plane server (server B) 104-2. In either case, the new distributed virtual switch 102 would be created with new identifiers (DVS B/DVPortgroup2). Using the stored configuration as a template allows an administrator to more easily create the new distributed virtual switch 102.

FIG. 7 depicts an example for applying a stored configuration to an existing distributed virtual switch 102 according to one embodiment. At 702, server (server A) 104-1 exports a configuration of distributed virtual switch 102-1 to client 106. At 704, client 106 stores the configuration in storage 108 and at 706, client 106 retrieves the configuration from storage 108 when the configuration is to be applied to an existing distributed virtual switch 102.

In one example, the retrieved configuration may be applied to the original distributed virtual switch 102-1. For example, at 710, configuration manager 124 applies the configuration on the original distributed virtual switch (DVS A) 102-1 on server 104-1 (server A). This would apply a previous version of the DVS configuration and port group configuration to distributed virtual switch 102-1.

In another example, at 714, configuration manager 124 may apply the configuration to another server (server B) 104-2. For example, the configuration of original distributed virtual switch (DVS A) 102-1 may be applied on server B. If existing port group 110-1 is used, then the stored port group configuration (DVPortgroup1) is used to apply the existing port group 110-1 to DVS A. Also, at 716, configuration manager 124 applies the port group configuration to a new port group (DVPortgroup2) 110-2 in distributed virtual switch (DVS B) 102-2.

Figure 8:
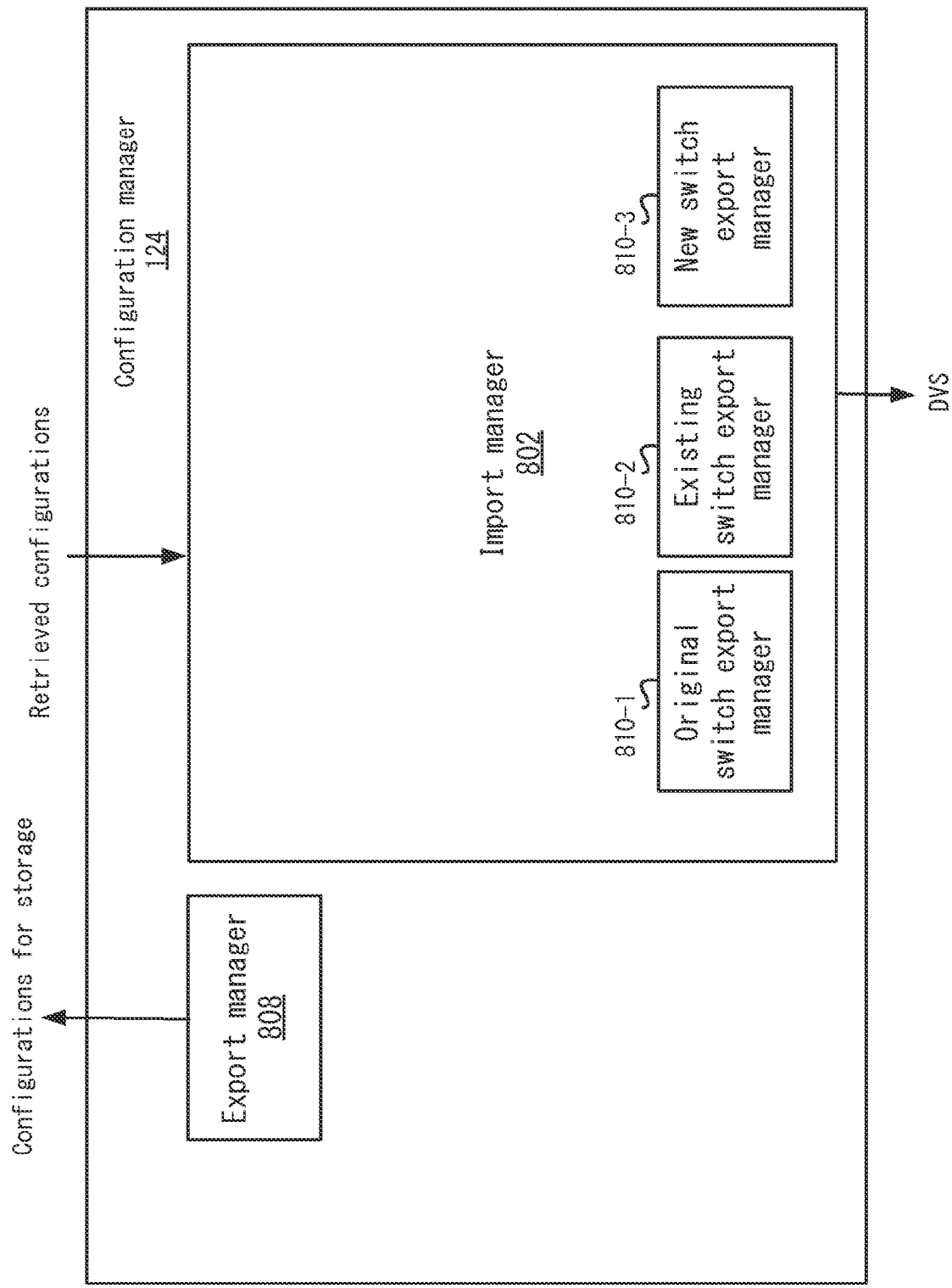
FIG. 8 depicts a more detailed example of a configuration manager according to one embodiment.

FIG. 8 depicts a more detailed example of configuration manager 124 according to one embodiment. An export manager 802 manages the storing of configurations for distributed virtual switches 102. In one embodiment, servers 104 may be requested by a client 106 to export the configurations for distributed virtual switches 102 to storage 108. The exporting of the configurations may go through client 106.

An import manager 802 receives the retrieved configuration and is then configured to apply the configuration to a server 104. For example, different managers 810 are provided to perform different actions in applying the configuration. For example, an original switch export manager 810-1 re-creates the original distributed virtual switch 102. An existing switch export manager 810-2 applies the configuration to an existing distributed virtual switch 102. A new switch export manager 810-3 uses the configuration to create a new distributed virtual switch 102.

Figure 9:
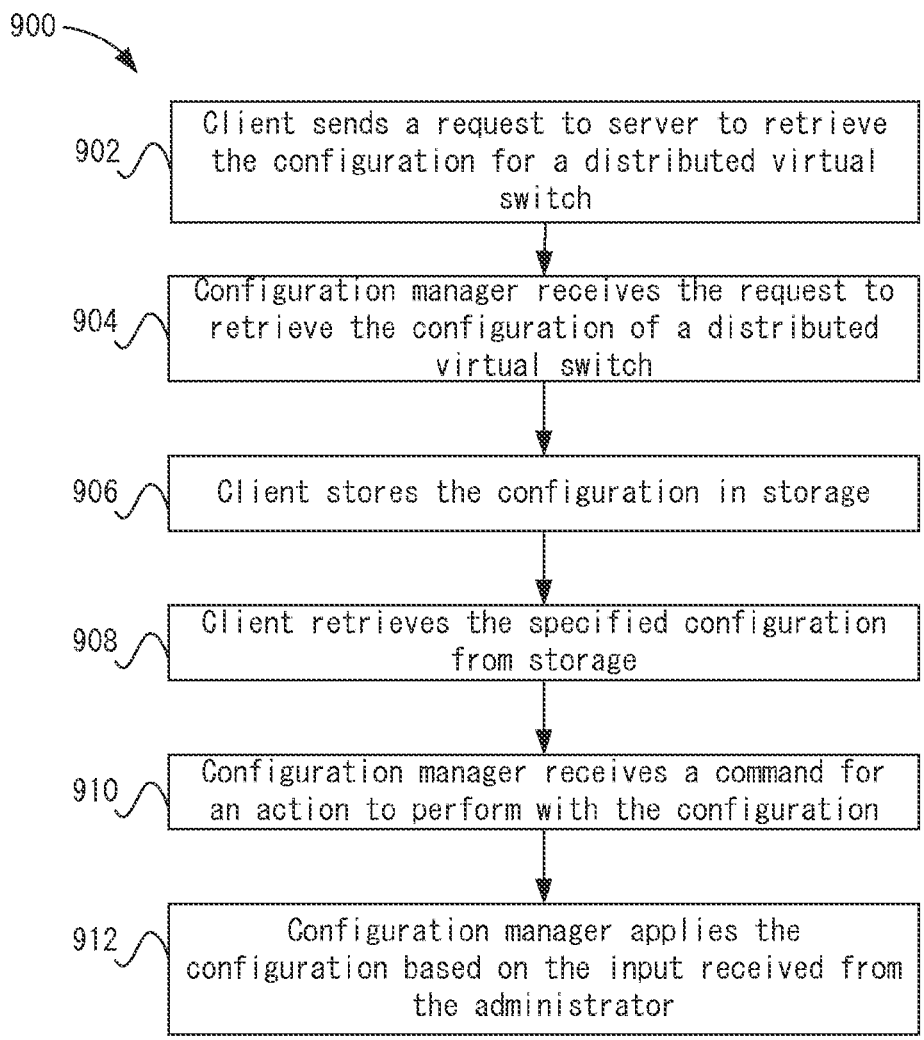
FIG. 9 depicts a simplified flowchart of a method for applying a configuration of a distributed virtual switch according to one embodiment.

FIG. 9 depicts a simplified flowchart 900 of a method for applying a configuration of a distributed virtual switch 102 according to one embodiment. At 902, client 106 sends a request to server 104 to retrieve the configuration for a distributed virtual switch 102. At 904, configuration manager 124 receives the request to retrieve the configuration of a distributed virtual switch 102.

At 906, client 106 stores the configuration in storage 108. An identifier for a configuration of a certain distributed virtual switch 102 that was saved at a certain time (e.g., a version) may be stored with the configuration. At 908, client 106 retrieves the specified configuration from storage 108.

At 910, configuration manager 124 receives a command for an action to perform with the configuration. For example, an administrator may choose to apply the configuration in different ways as described above. At 912, configuration manager 124 applies the configuration based on the input received from the administrator at 910.

Particular embodiments provide many advantages. For example, storing the configuration of distributed virtual switch 102 as a separate, independent entity in storage 108 enables administrators to publish and share the configuration with other administrators or systems. These configurations may be used to enforce certain policies for switch management across distributed virtual switches 102. Additionally, administrators may manipulate the configurations separately and then apply the manipulation to create new distributed virtual switches 102 or manipulate existing distributed virtual switches 102.

Further, because multiple versions of the configuration for distributed virtual switches 102 are saved, an administrator may revert to a previous version that was known to be working. This may provide high availability allowing an administrator to replace a non-working distributed virtual switch 102 with a configuration that is known to be working. The administrators are also freed up from the availability issues of the management plane because the configuration of a distributed virtual switch 102 may always be re-created using a backed-up version. The administrator knows that a working version is stored in storage 108 and thus can always revert when a distributed virtual switch 102 is not working. Additionally, by backing up different versions, a revision control system is provided. An administrator may back up a configuration upon each change to the configuration, and then revert to any previously backed up configuration if any changes are undesirable.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope of the invention as defined by the claims.

What is claimed is:

1. A system comprising:
a distributed virtual switch;
a management server configured to manage the distributed virtual switch;
a storage external to the management server, the storage storing a first snapshot of a first set of configuration settings of the distributed virtual switch; and
the management server causing one or more processors to:
receive a second snapshot of the distributed virtual switch, the second snapshot including a second set of configuration settings of the distributed virtual switch based on a time the second snapshot was taken, wherein the time the second snapshot was taken is later than a time the first snapshot was taken;
store a copy of the second snapshot of the second set of configuration settings in the storage external to the management server;
receive a request to import one of the stored first set of configuration settings and the stored second set of configuration settings to enable the distributed virtual switch comprising a current set of configuration settings to be re-configured with the one of the stored first set of configuration settings and the stored second set of configuration settings that are different than the current set of configuration settings; and
based on the request, import the one of the stored first set of configuration settings and the stored second set of configuration settings.

2. The system of claim 1, the management server further causing the one or more processors to access the stored first snapshot from the storage based on the request.

3. The system of claim 2, wherein
the management server further causes the one or more processors to:
receive the third snapshot of the distributed virtual switch, the third snapshot including the third set of configuration settings of the distributed virtual switch based on a time the third snapshot was taken; and
store the third snapshot in the storage external to the management server.

4. The system of claim 1, wherein the first set of configuration settings are different than the second set of configuration settings.

5. The system of claim 1, wherein the management server further causes the one or more processors to:
receive a request to provide the first set of configuration settings;
based on the request to provide the first set of configuration settings, access the copy of the first snapshot from the storage; and
provide the first set of configuration settings from the copy of the first snapshot.

6. The system of claim 5, wherein the management server provides the first set of configuration settings to the distributed virtual switch.

7. The system of claim 1, wherein the management server further causes the one or more processors to execute one or more of the following:
re-create the distributed virtual switch using the copy of the first snapshot; or
create a second distributed virtual switch using the copy of the first snapshot.

8. A method comprising:
receiving a request for a configuration of a distributed virtual switch;
based on the request, accessing a first snapshot and a second snapshot of a distributed virtual switch by a management plane server, the first snapshot comprising a first set of configuration settings of a distributed virtual switch based on a time the first snapshot was taken and the second snapshot of the distributed virtual switch comprising a second set of configuration settings of the distributed virtual switch based on a time the second snapshot was taken, wherein the time the second snapshot was taken is later than a time the first snapshot was taken;
storing a copy of each of the first snapshot comprising the first set of configuration settings and the second snapshot comprising the second set of configuration settings in a storage external to the management plane server;
receiving a request to import one of the first or the second set of configuration settings to enable the distributed virtual switch comprising a current set of configuration settings to be re-configured with the one of the stored first or second set of configuration settings that are different than the current set of configuration settings; and
based on the request, importing the one of the stored first or f-second set of configuration settings.

9. The method of claim 8, further comprising:
receiving a second request for the configuration of the distributed virtual switch; and
based on the second request, accessing the copy of the first or the second snapshot; and
providing the first or the second set of configuration settings of the distributed virtual switch from the copy of the first or the second snapshot.

10. The method of claim 8, further comprising:
receiving a request for a second configuration of the distributed virtual switch;
based on the request for the second configuration of the distributed virtual switch, accessing a third snapshot of the distributed virtual switch by the management plane server, the third snapshot including a third set of configuration settings of the distributed virtual switch based on a time the third snapshot was taken; and
storing a copy of the third snapshot in the storage external to the management plane server.

11. The method of claim 8, further comprising re-creating the distributed virtual switch using the copy of the first or the second snapshot.

12. The method of claim 8, further comprising creating a second distributed virtual switch using the copy of the first or the second snapshot.

13. The method of claim 8, further comprising applying a set of configuration settings from the copy of the first or the second snapshot to the distributed virtual switch.

14. One or more non-transitory computer-readable media having computer executable instructions that when executed by a processor, cause the processor to:
receive a request for a configuration of a distributed virtual switch;
based on the request, access a first snapshot and a second snapshot of the distributed virtual switch by a management plane server, the first snapshot comprising a first set of configuration settings of the distributed virtual switch based on a time the first snapshot was taken and the second snapshot of the distributed virtual switch comprising a second set of configuration settings of the distributed virtual switch based on a time the second snapshot was taken, wherein the time the second snapshot was taken is later than a time the first snapshot was taken;

store a copy of the first snapshot comprising the first set of configuration settings and the second snapshot comprising the second set of configuration settings in a storage external to the management plane server;

receive a request to import one of the first or the second set of configuration settings to enable the distributed virtual switch comprising a current set of configuration settings to be re-configured with the one of the stored first or second set of configuration settings that are different than the current set of configuration settings; and based on the request, import the one of the stored first or second set of configuration settings.

15. The one or more non-transitory computer-readable media of claim 14, wherein the computer executable instructions further cause the processor to:

receive a second request for the configuration of the distributed virtual switch; and based on the second request, access the copy of the first or the second snapshot; and provide the first or the second set of configuration settings of the distributed virtual switch from the copy of the first or the second snapshot.

16. The one or more non-transitory computer-readable media of claim 14, wherein the computer executable instructions further cause the processor to:

receive a request for a second configuration of the distributed virtual switch;

access a third snapshot of the distributed virtual switch by the management plane server, the third snapshot including a third set of configuration settings of the distributed virtual switch based on a time the third snapshot was taken; and store a copy of the third snapshot in the storage external to the management plane server.

17. The one or more non-transitory computer-readable media of claim 14, wherein the computer executable instructions further cause the processor to re-create the distributed virtual switch using the copy of the first or the second snapshot.

18. The one or more non-transitory computer-readable media of claim 14, wherein the computer executable instructions further cause the processor to create a second distributed virtual switch using the copy of the first or the second snapshot.

19. The one or more non-transitory computer-readable media of claim 14, wherein the computer executable instructions further cause the processor to apply the first or the second set of configuration settings from the copy of the first or the second snapshot to the distributed virtual switch.

20. The one or more non-transitory computer-readable media of claim 14, wherein the computer executable instructions further cause the processor to store the first and the second set of configuration settings in the management plane server.

* * * * *